UNITED STATES PATENT OFFICE.

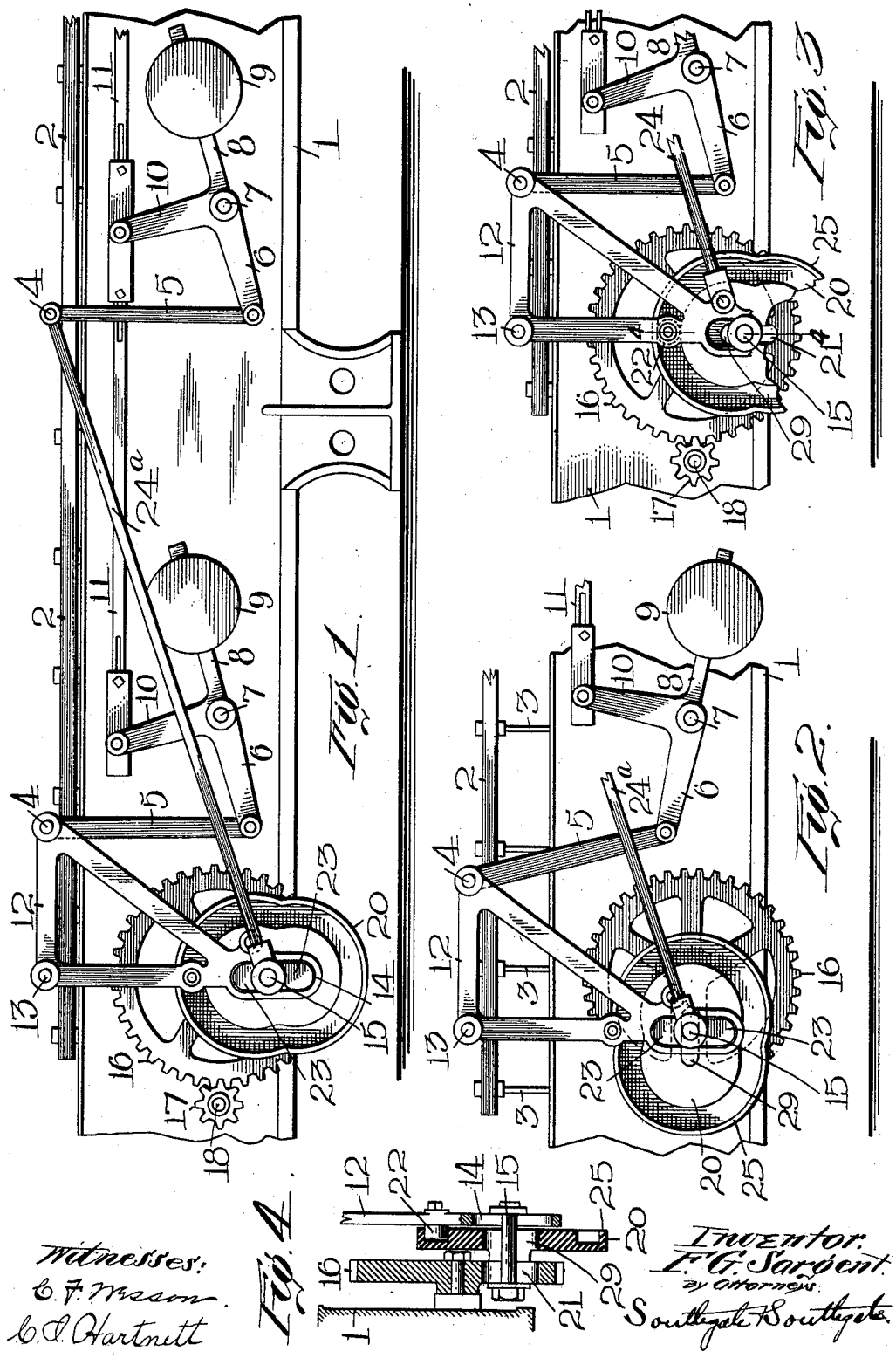

FREDERICK G. SARGENT, OF WESTFORD, MASSACHUSETTS, ASSIGNOR TO C. G. SARGENT'S SONS CORPORATION, OF GRANITEVILLE, MASSACHUSETTS, A CORPORATION OF MASSACHUSETTS.

RAKE-DRIVING MECHANISM.

1,047,117.

Specification of Letters Patent.

Patented Dec. 10, 1912.

Original application filed June 10, 1907, Serial No. 378,191. Divided and this application filed December 29, 1910. Serial No. 599,896.

*To all whom it may concern:*

Be it known that I, FREDERICK G. SARGENT, a citizen of the United States, residing at Westford, in the county of Middlesex and State of Massachusetts, have invented a new and useful Rake-Driving Mechanism, of which the following is a specification.

This invention relates to an improvement in the power operating mechanism for wool washing machines, of the well-known Sargent type, in which the counter-balanced rake receives its longitudinal motion from a crank, and is given a vertical motion either from the same crank or by means of a cam or the like connected therewith, the latter being shown in my Patent No. 889,157 granted May 26, 1908. This is a division of my application filed June 10, 1907, Serial No. 378,191.

The principal objects of the present invention are to provide a readily removable means whereby the entire motion of the rake can be changed from a reciprocating and rising and falling motion to a true rotary motion, and for securing a positive downward movement of the rake instead of depending on gravity as has heretofore been the case; and to simplify the construction of wool washing machines of this type.

Reference is to be had to the accompanying drawings, in which—

Figure 1 is a side elevation of a portion of a wool washing machine exhibiting this invention. Fig. 2 is a similar view showing the parts in another position. Fig. 3 is a view similar to Fig. 1 showing modifications, and Fig. 4 is a sectional view on the line 4—4 of Fig. 3.

In an older form of the Sargent parallel motion wool washing machines, the vertical motion of the rake was secured by the operation of the crank in a vertical slot formed in an arm or harp projecting from the rake on each side of the machine.

In order to illustrate this invention, certain features of the former devices are illustrated herein as follows:—The tank or bowl 1 of the wool washing machine is provided with a rake 2 having teeth 3. The rake is also provided with cross rods 4 secured thereto, and with swinging side arms 5 depending from the ends of said cross rods connected with bell cranks 6 at their lower ends, which are mounted on rock-shafts 7. On these bell cranks are mounted arms 8 provided with counter balancing weights 9. The upper arms 10 of the bell cranks are connected together by links 11 which may be adjusted so as to cause the counterbalances to rise and fall in unison, and to secure a true parallel motion for the entire harrow. The so-called harp 12 is located outside the bowl or tank on each side thereof, and its upper portion is fitted to the outer ends of one of the cross rods 4 and to an adjacent cross rod 13 which is attached to and forms part of the rake. The harp is provided for coöperation with the actuating devices from which movement is communicated to the rake. The lower portion of the harp has formed therein a vertical slot 14 in which works a crank-pin 15 carried rigidly by a gear-wheel 16 which is driven by means of a pinion 17 on the shaft 18 extending transversely through the bowl or tank. The bowl or tank in some of my prior constructions was provided with trucks carried by the cross rods 4 and 13 which rested and traveled on tracks when the rake was in its lowest position, but in the present construction the trucks and tracks are done away with. Turning with the gear wheel 16 is a cam 20 ordinarily employed for the purpose of lifting the rake.

The parts as so far described with the exception noted are substantially the same as those shown in my prior patent above identified.

In order to provide for locating the crank-pin 15 in different positions so that the length of stroke of the rake can be regulated, the gear-wheel is provided with a slot 21 (shown in Fig. 3) or any equivalent means, in which the crank-pin can be located at varying distances from the center of the wheel. The cam also has a similar slot 29. No means is shown for securing the crank pin in its adjusted positions as any ordinary means can be employed. This it will be seen will vary the length of the longitudinal stroke of the rake, while the cam 20 may operate upon a roller 22 journaled on the harp to give the rake the same vertical motion that it would have if the crank pin were left near the outer edge of the gear wheel. Obviously the crank pin is free to move up and down in the slot 14. It may be explained that the cam is so proportioned that the complete stroke is not greater than the length of the slot 14. The arm has an opening for receiving the axle of the roller 22. Now if it is desired to change the motion of the rake from a reciprocating to a rotary one, a pair of blocks 23 are placed in the slot 14 in the harp on each side of the crank pin, and the roll 22 is removed, as shown in Figs. 1 and 2. These blocks obviously are intended to be used also in the form shown in Fig. 3. It will be understood that in all this description, it is intended that the same changes be made on both sides of the machine, as it is ordinarily provided with a harp and operating mechanism on each side.

It will be observed that a link 24 is shown connecting one of the cross rods 4 with the harp. In the forms of the rake motion previously used, this link is connected with the harp in the manner indicated in Fig. 3, but when the blocks are employed, it is preferred to connect the corresponding link 24ª directly with the crank pin as shown in Figs. 1 and 2. This link 24 or 24ª it may be remarked serves substantially the same purpose as heretofore, but when the parts are connected as shown in Figs. 1 and 2, it transmits motion directly from the crank pin to the rake at a point at some distance from the harp so as to strengthen the device, but this connecting rod or link 24 may be omitted. It is simply shown as it is sometimes used. It will be noticed that this link, together with the rake and the harp constitute a triangle, the three sides of which are fixed with respect to each other, which is the same state of affairs as if the rod were connected in the manner shown in Fig. 3. With the blocks in position, the rotary motion of the crank pin is transmitted directly to the rake without modification, throughout its length so that it has a true rotary motion.

By the substitution of blocks of different relative lengths, the position of the crank pin relative to the harp can be adjusted. Another advantage of this construction is that the rake may be forced down into the wool positively, so that gravity is not depended on as heretofore. This is of advantage in cases where the wool is piled unevenly in such a manner as to tend to prevent the teeth of the rake from passing down through it. This feature of the invention is also included when the cam is used to operate the roll 22 for securing the vertical motion, the blocks 23 being omitted. This is provided for by adding to the cam 20 an outside flange 25, so that the roll 23 is pulled down positively when the cam returns to position shown in Fig. 3.

While I have illustrated and described particular forms of the invention, I am aware that many modifications may be made therein by any person skilled in the art without departing from the scope of the invention as expressed in the claims. Therefore, I do not wish to be limited to the particular forms shown, but What I do claim is:—

In a washing machine, the combination of a rotating wheel, a crank-pin mounted thereon, a rake, an arm depending therefrom having an elongated vertical slot, and removable blocks mounted in said slot and engaging opposite sides of said crank-pin, whereby the motion will be transmitted from said wheel to the rake.

In testimony whereof I have hereunto set my hand, in the presence of two subscribing witnesses.

FREDERICK G. SARGENT.

Witnesses:
WILLIAM F. SARGENT,
MINNIE ALFARTH.